(12) United States Patent
Gill

(10) Patent No.: US 7,865,053 B2
(45) Date of Patent: Jan. 4, 2011

(54) MULTI-SEMICONDUCTOR SLAB ELECTRO-OPTIC MODULATOR AND PROCESS FOR USING THE SAME

(75) Inventor: Douglas M. Gill, South Orange, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 148 days.

(21) Appl. No.: 11/617,830

(22) Filed: Dec. 29, 2006

(65) Prior Publication Data

US 2008/0159680 A1 Jul. 3, 2008

(51) Int. Cl.
*G02B 6/10* (2006.01)

(52) U.S. Cl. .............. 385/131; 385/1; 385/2; 385/3; 385/8; 385/129; 385/132

(58) Field of Classification Search ........ None
See application file for complete search history.

(56) References Cited

U.S. PATENT DOCUMENTS

| | | | |
|---|---|---|---|
| 6,374,001 B1 * | 4/2002 | Bozeat et al. .............. 385/8 |
| 7,447,395 B2 * | 11/2008 | Montgomery et al. ........ 385/14 |
| 2005/0244125 A1 * | 11/2005 | Liu .......................... 385/129 |
| 2006/0039666 A1 * | 2/2006 | Knights et al. ............. 385/129 |
| 2007/0081781 A1 * | 4/2007 | Blauvelt et al. ............ 385/129 |

* cited by examiner

*Primary Examiner*—Uyen-Chau N Le
*Assistant Examiner*—Chad H Smith
(74) *Attorney, Agent, or Firm*—Hitt Gaines, PC

(57) ABSTRACT

In one embodiment, the apparatus includes a substrate having a surface and an optical waveguide having a ridge-shaped semiconductor optical core, the ridge-shaped semiconductor optical core being located over the surface. The apparatus may further include a first semiconductor slab being in contact with a first portion of the ridge-shaped semiconductor optical core, and a second semiconductor slab being in contact with a second portion of the ridge-shaped semiconductor optical core, the second semiconductor slab being farther from the surface than the first semiconductor slab.

18 Claims, 5 Drawing Sheets

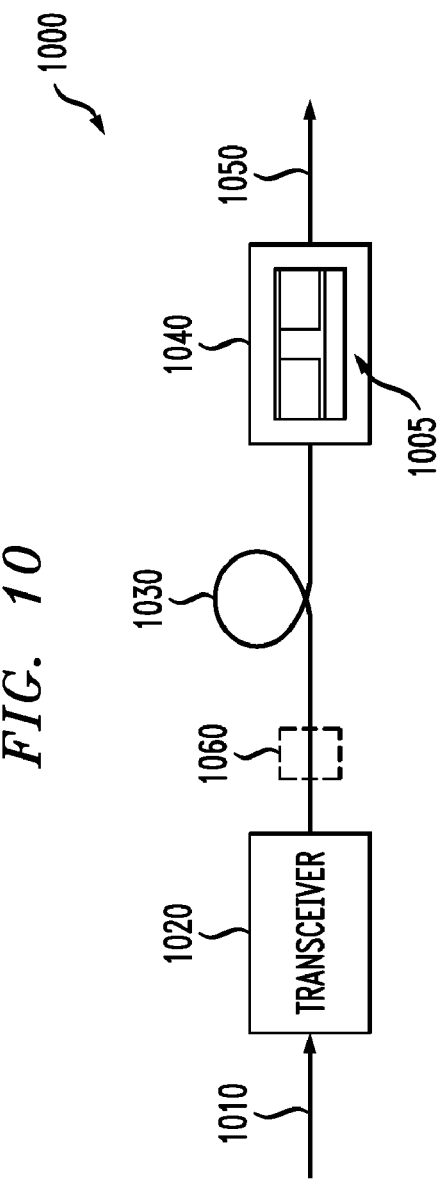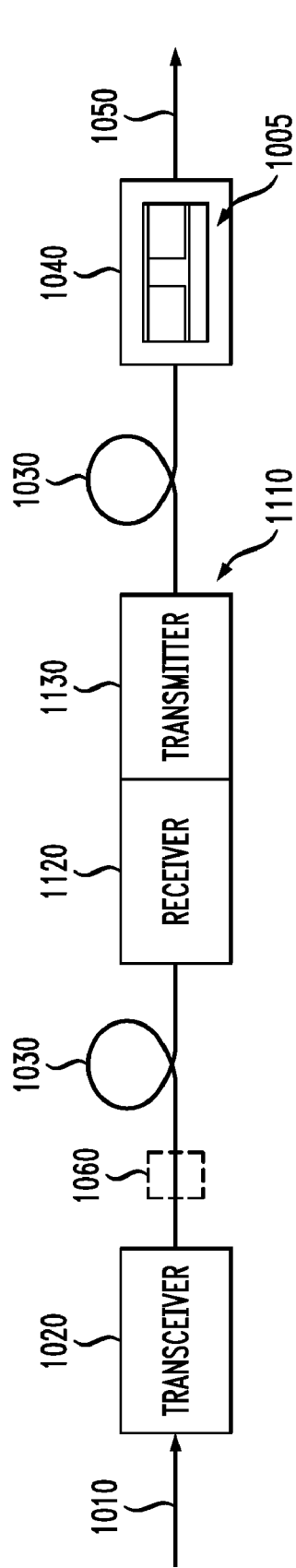

MULTI-SEMICONDUCTOR SLAB ELECTRO-OPTIC MODULATOR AND PROCESS FOR USING THE SAME

The U.S. Government has a paid-up license in this invention and the right in limited circumstances to require the patent owner to license others on reasonable terms as provided for by the terms of Contract No. HR0011-05-C-0027 awarded by DARPA under the Microsystems Technology Office.

TECHNICAL FIELD OF THE INVENTION

The present invention is directed, in general, to an electro-optic modulator and, more specifically, to a multi-semiconductor slab electro-optic modulator, method of operation thereof, and method of manufacture therefore.

BACKGROUND OF THE INVENTION

There is currently a desire to leverage the knowledge and efficiencies associated with the manufacture of certain electronic devices to help with the manufacture of certain photonics devices. There is a particular desire to leverage the well-known process flow used to manufacture complementary metal oxide semiconductor (CMOS) devices in the manufacture of electro-optic modulators. In leveraging the know-how of the electronics industry, the photonics industry desires to streamline the manufacture of such electro-optic modulators, and therefore reduce their cost of manufacture to levels only obtained with CMOS devices.

SUMMARY OF THE INVENTION

Current electro-optic modulators that are manufactured in CMOS compatible platforms inject current laterally into the optical waveguide, for example using a single semiconductor slab design, to induce the optical phase shift. Unfortunately, this geometry can fundamentally limit the response speed of the device. For instance, due to the nature of the optical confinement in the waveguide and the intrinsic excess optical loss associated with the overlap between the optical mode and ohmic contacts/doped silicon regions, device response speed is limited. To address this deficiency of the prior art, various embodiments provide apparatus and methods for operating apparatus.

In a first embodiment, the apparatus includes a substrate having a surface and an optical waveguide having a ridge-shaped semiconductor optical semiconductor optical core, the ridge-shaped semiconductor optical core located over the surface. The apparatus may further include a first semiconductor semiconductor slab in contact with a first portion of the ridge-shaped semiconductor optical core, and a second semiconductor slab in contact with a second portion of the ridge-shaped semiconductor optical core. The second semiconductor slab is farther from the surface than the first semiconductor slab.

Another embodiment provides a method for operating an optical waveguide. The method, without limitation, may include applying a voltage across a ridge-shaped semiconductor optical core of an optical waveguide to cause a current of charge carriers to propagate between a first portion of the ridge-shaped semiconductor optical core and a second portion of the ridge-shaped semiconductor optical core, the ridge-shaped semiconductor optical core being located over a surface of a substrate, wherein the second portion is farther from the surface than the first portion.

BRIEF DESCRIPTION OF THE DRAWINGS

The various embodiments can be understood from the following detailed description, when read with the accompanying figures. Various features may not be drawn to scale and may be arbitrarily increased or reduced in size for clarity of discussion. Reference is now made to the following descriptions taken in conjunction with the accompanying drawings, in which:

FIG. 10 illustrates a plan view of an optical communications system, which may form one environment in which an apparatus may be used; and FIG. 11 illustrates an alternative optical communications system.

DETAILED DESCRIPTION

Various embodiments are based, at least in part, on the recognition that certain optical devices (e.g., certain electro-optic modulators) may benefit greatly by dimensionally separating the optical confinement and response speed therein. For instance, the present inventors have recognized that by injecting current into the waveguide in a vertical direction, as opposed to the traditional lateral direction, that the optical confinement may still be essentially controlled in the lateral direction, but the response speed may now be controlled in the vertical direction. By decoupling the two, the present inventors recognize that highly confining waveguides may be manufactured having fast response speed and low optical loss.

Figure 1:
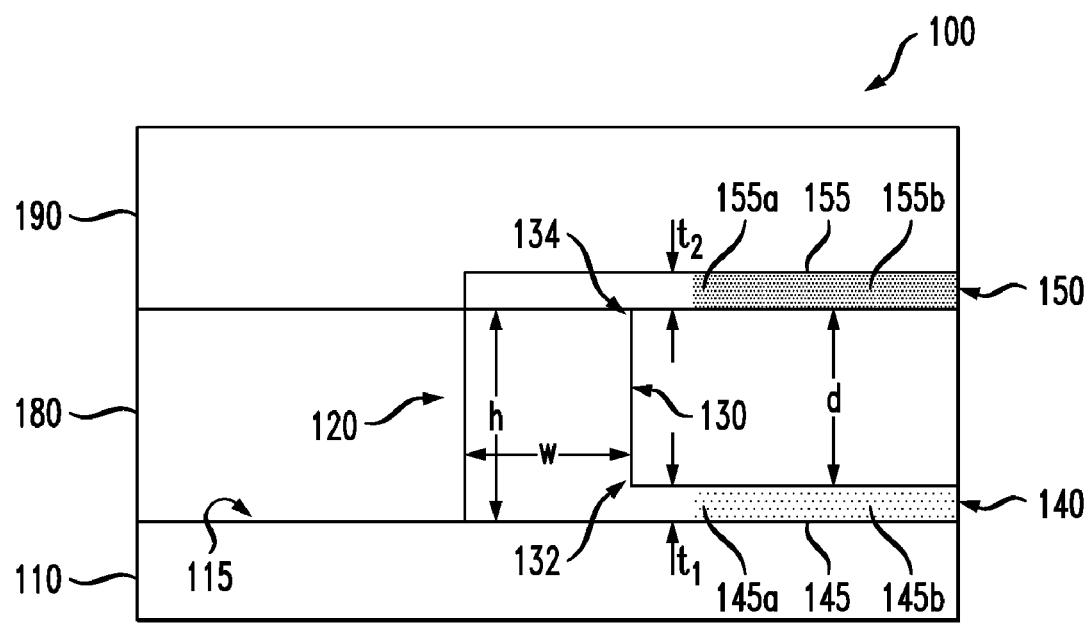
FIG. 1 illustrates a cross-sectional view of an apparatus.

Referring initially to FIG. 1, illustrated is a cross-sectional view of one embodiment of an apparatus 100. The embodiment of the apparatus 100 in FIG. 1 is configured as an electro-optic modulator. For instance, in one embodiment the apparatus 100 of FIG. 1 might be an electro-optic modulator including conventional semiconductor materials. Nonetheless, the apparatus 100 is not limited to the electro-optic modulator illustrated in FIG. 1.

The apparatus 100 includes a substrate 110 that may have many different compositions. In one embodiment, however, the substrate 110 comprises a material common to semiconductor devices. For example, the substrate 110 might comprise an electrical dielectric that also has a refractive index suitable for providing optical confinement. In such embodiment, the substrate 110 might comprise an oxide. However, in other embodiments the substrate 110 might comprise Silicon, Gallium Arsenide, Indium Phosphide, or a polymer material, among others. Additionally, the substrate need not comprise a single layer, and thus might comprise one or more layers.

The substrate 110 shown includes a surface 115. In the embodiment shown, the surface 115 is an upper surface of the substrate 110. Nevertheless, those skilled in the art understand that the term "upper" is a relative term, and that the surface 115 would be a lower surface if the apparatus 100 were rotated by about 180 degrees.

Located over the substrate 110 in the embodiment of FIG. 1 is an optical waveguide 120. For instance, the optical waveguide 120 may be a planar optical waveguide or other optical waveguide and still remain within the purview of this embodiment. The optical waveguide 120 shown includes a ridge-shaped semiconductor optical core 130. The ridge-shaped semiconductor optical core 130 is configured to laterally confine an optical signal passing there through. As those skilled in the art appreciate, an optical signal passing through the ridge-shaped semiconductor optical core 130 would be passing into and/or out of the page.

The ridge-shaped semiconductor optical core 130 illustrated in FIG. 1 may comprise various different semiconducting materials. For instance, the ridge-shaped semiconductor optical core 130 might comprise a semiconductor such as silicon, a group III-V material such as gallium arsenide, and other similar semiconducting materials. In the embodiment of FIG. 1, however, the ridge-shaped semiconductor optical core 130 comprises silicon.

The ridge-shaped semiconductor optical core 130 may additionally comprise various different configurations. For instance, the ridge-shaped semiconductor optical core 130 may have various different shapes, widths (w), heights (h), etc. while staying within the confines of the present embodiment. In one embodiment, the width (w) of the ridge-shaped semiconductor optical core 130 ranges from about 300 nm to about 1000 nm, and the height (h) of the ridge-shaped semiconductor optical core 130 ranges from about 100 nm to about 400 nm. Accordingly, in one embodiment the ridge-shaped semiconductor optical core 130 would have an aspect ratio (i.e., height (h) to width (w)) ranging from about 0.5 to about 0.1. It is believed that the aforementioned ranges for the widths (w), heights (h), and aspect ratios provide significant advantages, particularly when used with silicon. Nevertheless, this embodiment should not be limited thereto.

Contacting a first portion 132 of the ridge-shaped semiconductor optical core 130 in the embodiment of FIG. 1 is a first semiconductor slab 140. Note that in this first instance the waveguide ridge and semiconductor slab are realized by partially etching through the semiconductor film thickness, h. Alternately, the first semiconductor slab 140 could be created by fully etching through the semiconductor film thickness to first make a rectangular shaped channel waveguide and then depositing a semiconductor slab material, such as polycrystalline silicon, to form the first waveguide semiconductor slab 140.

In the embodiment shown, the first semiconductor slab 140 comprises the same material as the ridge-shaped semiconductor optical core 130. For instance, the first semiconductor slab 140 and the ridge-shaped semiconductor optical core 130 may both originate from the same material layer, in this instance silicon. Nevertheless, it is envisioned that embodiments may exist wherein the first semiconductor slab 140 and the ridge-shaped semiconductor optical core 130 comprise different semiconducting materials, e.g., different semiconducting alloys. In those embodiments wherein the first semiconductor slab 140 and the ridge-shaped semiconductor optical core 130 originate from the same material layer, no physical interface exists there between.

The first semiconductor slab 140 may have various thicknesses ($t_1$) For example, the thicknesses ($t_1$) may range anywhere from about 20 nm to about 100 nm, and beyond. Nevertheless, in the embodiment of FIG. 1 the thickness ($t_1$) is around about 50 nm. Other thicknesses ($t_1$) could nonetheless be used.

The illustrated first semiconductor slab 140 includes a dopant 145 located therein. The dopant 145 may be either an n-type dopant or p-type dopant, based particularly on whether the later discussed dopant 155 is an n-type dopant or p-type dopant, and vice-versa. In the given embodiment of FIG. 1, however, the dopant 145 comprises an n-typed dopant (e.g., phosphorous). In one embodiment, a concentration of the dopant 145 is relatively the same at differing positions along the first semiconductor slab 140. In another embodiment, however, the first semiconductor slab 140 contains a relatively low doped region 145a proximate the ridge-shaped semiconductor optical core 130 and a relatively high doped region 145b distal the ridge-shaped semiconductor optical core 130. In this embodiment, the relatively low doped region 145a might have a dopant level at least about three, and often five, times lower than a dopant level of the relatively higher doped region 145b. For example, the relatively low doped region 145a might have a peak dopant concentration ranging from about 1E16 atoms/cm$^3$ to about 5E18 atoms/cm$^3$ and the relatively higher doped region 145b might have a peak dopant concentration ranging from about 5E18 atoms/cm$^3$ to about 5E20 atoms/cm$^3$.

Also in contact with a second portion 134 of the ridge-shaped semiconductor optical core 130 is a second semiconductor slab 150. In the embodiment shown, the second semiconductor slab 150 comprises the same material as the first semiconductor slab 140, and thus the same material as the ridge-shaped semiconductor optical core 130. Nevertheless, it is envisioned that embodiments may exist wherein the second semiconductor slab 150 and the first semiconductor slab 140, or alternatively the second semiconductor slab 150 and the ridge-shaped semiconductor optical core 130, comprise different materials. In the illustrative embodiment of FIG. 1 the second semiconductor slab 150 and the ridge-shaped semiconductor optical core 130 originated from different material layers. Accordingly, a physical interface may exist between the second semiconductor slab 150 and the ridge-shaped semiconductor optical core 130 in this embodiment.

The second semiconductor slab 150 may have varying thicknesses ($t_2$). In most embodiments, however, the thicknesses ($t_2$) would be similar to the thicknesses ($t_1$) discussed above. Accordingly, the thickness ($t_2$) in the embodiment shown is around about 50 nm. Other thicknesses ($t_2$) could also be used.

The illustrated second semiconductor slab 150 includes a dopant 155 located therein. The dopant 155 would generally be the opposite charge-type to the dopant 145 previously discussed. Accordingly, the dopant 155 of the apparatus 100 would be a p-type dopant (e.g., boron). Nevertheless, the skilled artisan understands that the dopant types for the dopant 145 and dopant 155 could switch.

Similar to the dopant 145, a concentration of the dopant 155 may be relatively the same at differing positions along the second semiconductor slab 150, in one embodiment. In another embodiment, however, the second semiconductor slab 150 contains a relatively low doped region 155a proximate the ridge-shaped semiconductor optical core 130 and a relatively high doped region 155b distal the ridge-shaped semiconductor optical core 130. In this embodiment, the relatively low doped region 155a has a dopant level at least ten times lower than a dopant level of the relatively higher doped region 155b.

In the embodiment illustrated in FIG. 1, the first semiconductor slab 140 is located directly on the surface 115, wherein the second semiconductor slab 150 is located above the first semiconductor slab 140. In this embodiment, the first and second semiconductor slabs 140, 150 might be spatially separated from one another by a distance (d) ranging from about 100 nm to about 400 nm, among others. Additionally, a plane of a surface of the first semiconductor slab 140 located on the surface 115 and a plane of a surface of the second semiconductor slab 150 located more near the surface 115 are parallel to one another, in one embodiment. In another embodiment, a plane created by the first semiconductor slab 140 and a plane created by the second semiconductor slab 150 are parallel to one another.

The embodiment of FIG. 1 also illustrates that the ridge-shaped semiconductor optical core 130 is located directly on the surface 115. Accordingly, a plane of a surface of the ridge-shaped semiconductor optical core 130 located on the surface 115 and the plane of the surface of the first semiconductor slab 140 located on the surface 115 may be coplanar.

The apparatus 100 of FIG. 1 further includes a cladding layer 180. In the illustrative embodiment, the cladding layer 180 substantially surrounds the ridge-shaped semiconductor optical core 130. For instance, the cladding layer 180 might comprise an electrical dielectric with a suitably low refractive index to provide optical confinement in the adjacent semiconductor slabs and core. Exemplary materials include the oxide previously discussed, or another similar substantially transparent dielectric.

The apparatus 100 of FIG. 1 may further include another cladding layer 190. The cladding layer 190 might comprise materials substantially similar to the materials that the cladding layer 180 might comprise. Accordingly, no further detail is needed.

The apparatus 100 of FIG. 1 may be operated, in one embodiment, by applying a voltage across the ridge-shaped semiconductor optical core 130 to cause a current of charge carriers to propagate between a first portion 132 of the ridge-shaped semiconductor optical core 130 and a second portion 134 of the ridge-shaped semiconductor optical core 130. In the instant embodiment, the first and second semiconductor slabs 140, 150, directly next to the first and second portions 132, 134 of the ridge-shaped semiconductor optical core 130, respectively, are used to apply the aforementioned voltage and thereby induce an optical phase shift in an optical signal passing through the ridge-shaped semiconductor optical core 130. Accordingly, in this embodiment the current is injected into the ridge-shaped semiconductor optical core 130 in a vertical direction using the multi-semiconductor slab design of FIG. 1 to induce the optical phase shift.

Figure 2:
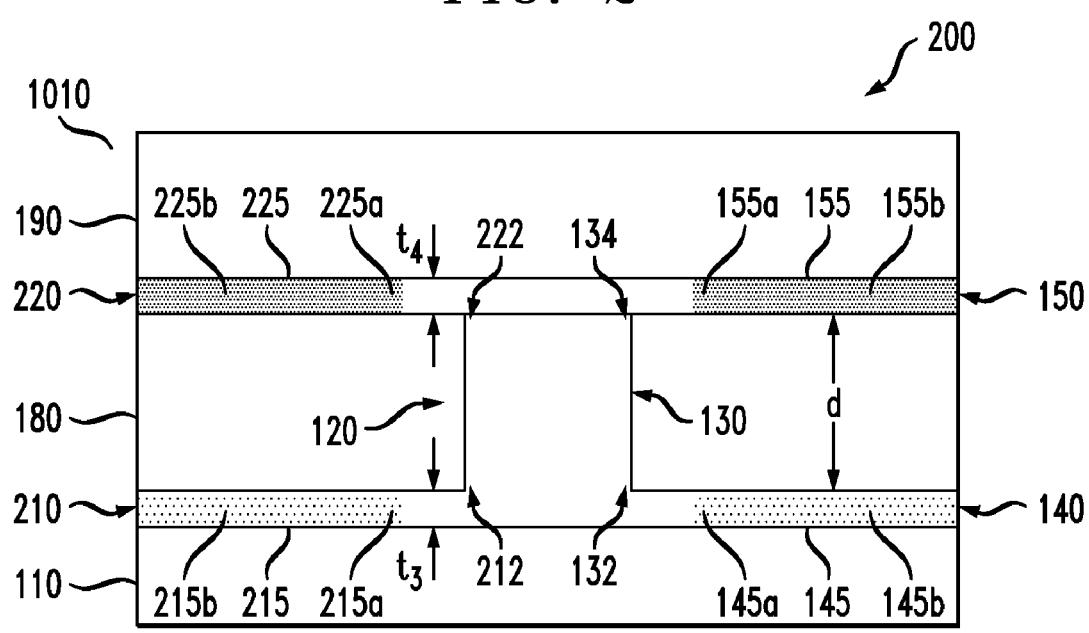
FIG. 2 illustrates a cross-sectional view of an alternative embodiment of an apparatus.

Turning now to FIG. 2, illustrated is a cross-sectional view of an alternative embodiment of an apparatus 200. The apparatus 200 of FIG. 2 has many of the same features as the apparatus 100 of FIG. 1. Accordingly, wherein similar features exist like reference numbers have been used.

The apparatus 200 of FIG. 2, in addition to many of the features of the apparatus 100, includes a third semiconductor slab 210 connected to a third portion 212 of the ridge-shaped semiconductor optical core 130. In the particular embodiment shown, the third semiconductor slab 210 is located on an opposite side of the ridge-shaped semiconductor optical core 130 as the first semiconductor slab 140.

The third semiconductor slab 210 may comprise many of the same types of materials as the first semiconductor slab 140. The third semiconductor slab 210, in the embodiment shown, originated from the same material layer as the ridge-shaped semiconductor optical core 130 and the first semiconductor slab 140, and thus is a semiconductor (e.g., silicon). In this embodiment, no physical interface exists where the third semiconductor slab 210 contacts the third portion 212.

The third semiconductor slab 210 may have various thicknesses ($t_3$). For example, the thicknesses ($t_3$) may range anywhere from about 20 nm to about 100 nm, and beyond. Nevertheless, in the embodiment of FIG. 2 the thickness ($t_3$) is substantially similar to the thickness ($t_1$), and thus is around about 50 nm. Other thicknesses ($t_3$) could, however, also be used.

The illustrated third semiconductor slab 210 includes a dopant 215 located therein. The dopant 215 may be either an n-type dopant or p-type dopant, based particularly on whether the later discussed dopant 225 is an n-type dopant or p-type dopant, and vice-versa, as well as whether the dopant 145 is an n-type dopant or p-type dopant. In the given embodiment of FIG. 2, however, the dopant 215 comprises an n-typed dopant (e.g., phosphorous). It is preferred that the dopant 215 be of the same charge-type as the dopant 145.

In one embodiment, a concentration of the dopant 215 is relatively the same at differing positions along the third semiconductor slab 210. In another embodiment, however, the third semiconductor slab 210 contains a relatively low doped region 215a proximate the ridge-shaped semiconductor optical core 130 and a relatively high doped region 215b distal the ridge-shaped semiconductor optical core 130. In this embodiment, the relatively low doped region 215a has a dopant level at least about three times lower than a dopant level of the relatively higher doped region 215b, and in alternative embodiments at least about three, and often five, times lower and at least about ten times lower. In one embodiment, the relatively low doped region 215a has a peak dopant concentration ranging from about 1E16 atoms/cm$^3$ to about 5E18 atoms/cm$^3$ and the relatively higher doped region 215b has a peak dopant concentration ranging from about 5E18 atoms/cm$^3$ to about 5E20 atoms/cm$^3$.

Also in contact with a fourth portion 222 of the ridge-shaped semiconductor optical core 130 is a fourth semiconductor slab 220. In the embodiment shown, the fourth semiconductor slab 220 comprises the same material as the first semiconductor slab 140, second semiconductor slab 150, third semiconductor slab 210, and thus the same material as the ridge-shaped semiconductor optical core 130. Nevertheless, it is envisioned that embodiments may exist wherein the fourth semiconductor slab 220 may comprise a different semiconducting material. In the illustrative embodiment of FIG. 2 the fourth semiconductor slab 220 and the ridge-shaped semiconductor optical core 130 originated from different material layers. Accordingly, a physical interface may exist between the fourth semiconductor slab 220 and the ridge-shaped semiconductor optical core 130 in this embodiment.

The fourth semiconductor slab 220 may have various thicknesses ($t_4$). In most embodiments, however, the thicknesses ($t_4$) would be similar to the thicknesses ($t_2$) discussed above. Accordingly, the thickness ($t_4$) in the embodiment shown is around about 50 nm. Other thicknesses ($t_4$) might be used.

The illustrated fourth semiconductor slab 220 includes a dopant 225 located therein. The dopant 225 would generally be opposite in charge-type to the dopant 215, and similar in charge-type to the dopant 155, both of which were previously discussed. Accordingly, the dopant 225 of the apparatus 200 would be a p-type dopant (e.g., boron). Nevertheless, the skilled artisan understands that the types of dopant for the dopants 145, 155, 215 and 225 could switch.

Similar to the dopant 215, a concentration of the dopant 225 may be relatively the same at differing positions along the fourth semiconductor slab 220, in one embodiment. In another embodiment, however, the fourth semiconductor slab 220 contains a relatively low doped region 225a proximate the ridge-shaped semiconductor optical core 130 and a relatively high doped region 225b distal the ridge-shaped semiconductor optical core 130. In this embodiment, the relatively low doped region 225a has a dopant level at least about three, and often five, times lower than a dopant level of the relatively higher doped region 225b. In one embodiment, the relatively low doped region 225a has a peak dopant concentration ranging from about 1E16 atoms/cm$^3$ to about 5E18 atoms/cm$^3$ and the relatively higher doped region 225b has a peak dopant concentration ranging from about 5E18 atoms/cm$^3$ to about 5E20 atoms/cm$^3$.

In the embodiment illustrated in FIG. 2, the first and third semiconductor slabs 140, 210 are located directly on the surface 115, wherein the second and fourth semiconductor slabs 150, 220 are located above the first semiconductor slab 140 and third semiconductor slab 210, respectively. In this embodiment, the first and second semiconductor slabs 140, 150 and third and fourth semiconductor slabs 210, 220, respectively, might be spatially separated from one another by a distance (d) ranging from about 100 nm to about 250 nm, among others, respectively.

The relative positions of the first, second, third and fourth slabs 140, 150, 210, 220, with respect to each other are, in certain embodiments, important. For example, in one embodiment, a plane of a surface of the first semiconductor slab 140 located on the surface 115 and a plane of a surface of the third semiconductor slab 210 located on the surface 115 are coplanar. Moreover, wherein the first and third semiconductor slabs 140, 210 are of similar thickness, the first and third semiconductor slabs 140, 210, themselves are coplanar. Likewise, in another embodiment, a plane of a surface of the second semiconductor slab 140 located nearest to the surface 115 and a plane of a surface of the fourth semiconductor slab 220 located nearest to the surface 115 are coplanar. Moreover, wherein the second and fourth semiconductor slabs 150, 220 are of similar thickness, the second and fourth semiconductor slabs 150, 220, themselves are coplanar. In another embodiment, the plane of the surface of the third semiconductor slab 210 located on the surface 115 and the plane of the surface of the second semiconductor slab 150 located nearest the surface 115 are parallel to one another. Likewise, the plane of the surface of the first semiconductor slab 140 located on the surface 115 and the plane of the surface of the fourth semiconductor slab 220 located nearest the surface 115 may be parallel to one another. The embodiment of FIG. 2 also illustrates that the ridge-shaped semiconductor optical core 130 is located directly on the surface 115.

The apparatus 200 of FIG. 2 may be operated, in one embodiment, by applying various voltages across multiple regions of the ridge-shaped semiconductor optical core 130 to cause currents of charge carriers to propagate between a first portion 132 of the ridge-shaped semiconductor optical core 130 and a second portion 134 of the ridge-shaped semiconductor optical core 130, as well as between a third portion 212 of the ridge-shaped semiconductor optical core 130 and a fourth portion 222 of the ridge-shaped semiconductor optical core 130. In the instant embodiment, the first and second semiconductor slabs 140, 150, directly adjacent to the first and second portions of the ridge-shaped semiconductor optical core 130, respectively, and the third and fourth semiconductor slabs 210, 220, directly adjacent to the third and fourth portions 212, 222, of the ridge-shaped semiconductor optical core 130, respectively, are used to apply the aforementioned voltages and induce an optical phase shift in an optical signal passing through the ridge-shaped semiconductor optical core 130. Accordingly, in this embodiment the multiple currents can be injected into the ridge-shaped semiconductor optical core 130 in a vertical direction using the multi-semiconductor slab design of FIG. 2 to induce an optical phase shift in optical signals propagating through the semiconductor optical core 130.

An apparatus, such as the apparatus 100 of FIG. 1 or the apparatus 200 of FIG. 2, has many advantages over conventional electro-optic modulators. First, the multi-semiconductor slab design allows the decoupling of the optical confinement and electrical response speed. Heretofore, the two were directly coupled and thus would be optimized relative to the other. Here, however, electrical response speed and optical confinement may be optimized substantially independent of the other. Accordingly, an apparatus may be manufactured having both fast electrical response times and low optical losses.

Figure 3:
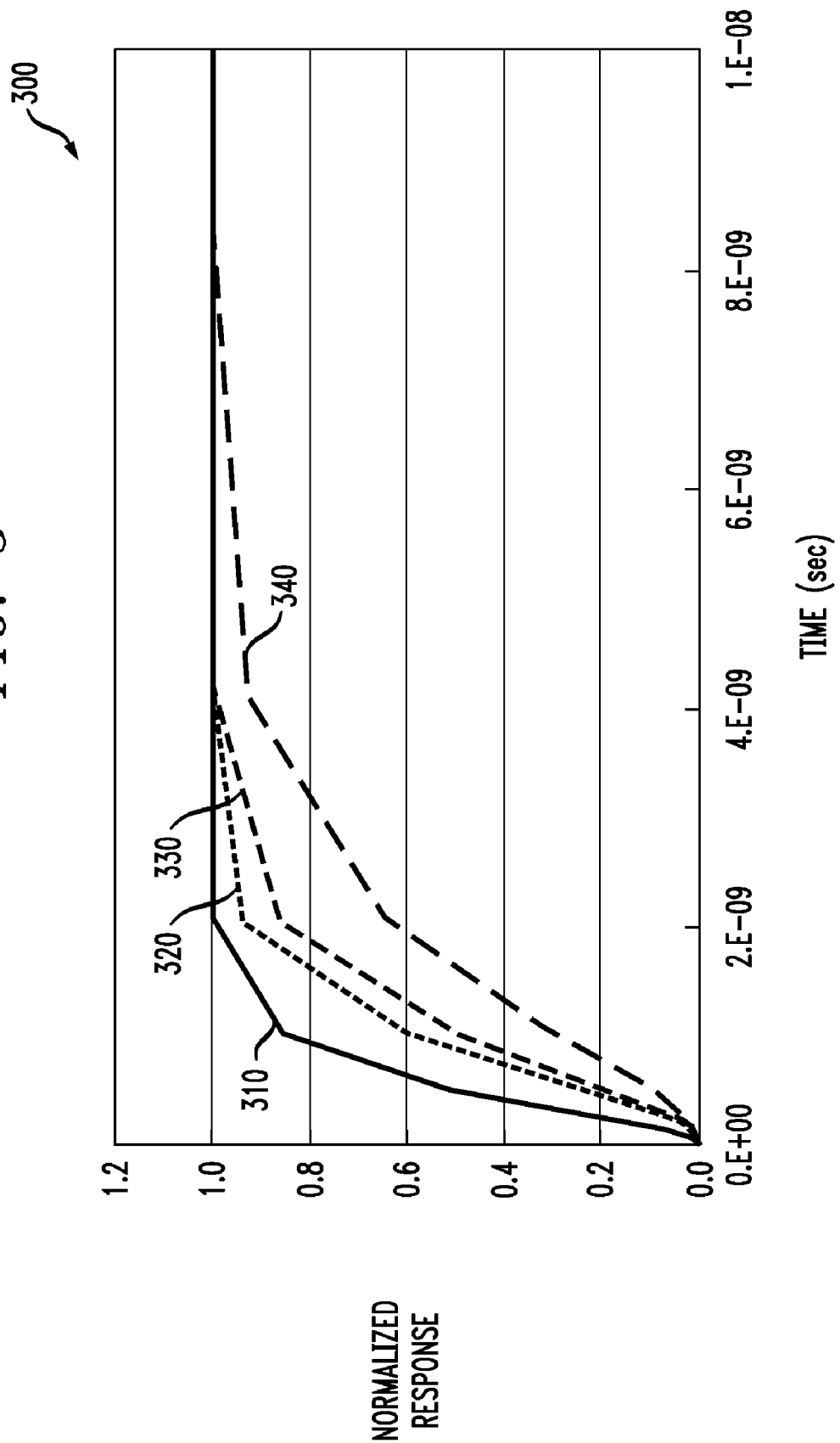
FIG. 3 illustrates a graph comparing the transient response time for an apparatus manufactured according to one embodiment and three other conventional apparatus.

Turning briefly to FIG. 3, illustrated is a graph 300 comparing the transient electrical response time for an apparatus manufactured in accordance with one embodiment and three other conventional apparatus. The response curve 310 is representative of what an apparatus substantially similar to the apparatus 200 of FIG. 2 might achieve. Alternatively, the response curve 320 is representative of what an 75 nm thickness single semiconductor slab electro-optic modulation might achieve, the response curve 330 is representative of what an 50 nm thickness single semiconductor slab electro-optic modulation might achieve, and the response curve 340 is representative of what an 25 nm thickness single semiconductor slab electro-optic modulation might achieve. As is illustrated, the response curve 310 indicates a significantly faster response time than the response curves 320, 330, and 340.

Turning now to FIGS. 4-9, illustrated are cross-sectional views of an apparatus 400 at various different stages of manufacture. The apparatus 400 of FIGS. 4-9 is substantially similar to the apparatus 200 of FIG. 2. Given the teachings of FIGS. 4-9, one skilled in the art would be able to modify the manufacturing process to manufacture an apparatus substantially similar to the apparatus 100 of FIG. 1.

Figure 4:
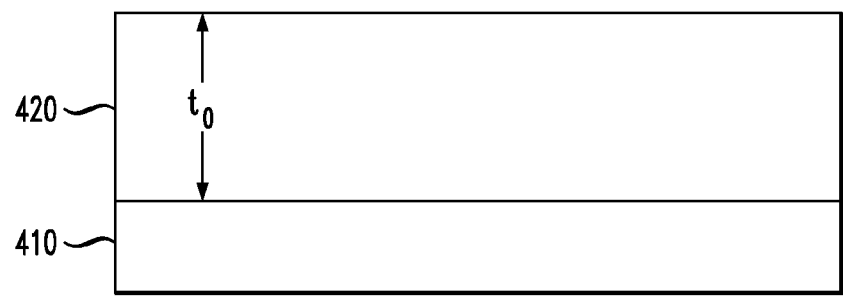
FIGS. 4 thru 9 illustrate cross-sectional views of an apparatus (e.g., the apparatus of FIG. 2) at various different stages of manufacture.

The apparatus 400 of FIG. 4 includes a substrate 410 having a material layer 420 located there over. In the illustrative embodiment the substrate 410 comprises an oxide and the material layer 420 comprises silicon. Accordingly, the combination of the substrate 410 and the material layer 420 might comprise a silicon-on-insulator (SOI) structure. While the substrate 410 and material layer 420 have been described as an oxide and silicon, respectively, as indicated above, other materials might be used. For example, in another embodiment the substrate 410 may comprise Silicon, Gallium Arsenide, Indium Phosphide, or a polymer material and the material layer 420 may comprise Silicon, Gallium Arsenide, Indium Phosphide, or a polymer material.

In the embodiment shown in FIG. 4, the material layer 420 is located directly on the substrate 410 and has an original thickness ($t_o$). While the original thickness ($t_o$) of the material layer 420 may vary, in one embodiment, the original thickness ($t_o$) is in the range from about 200 nm to about 300 nm, among others. The present embodiment, however, should not be limited to any specific original thickness ($t_o$).

The process for forming or providing the substrate 410 and material layer 420 may be conventional. For instance, conventional deposition steps might be used to form such features.

Figure 5:
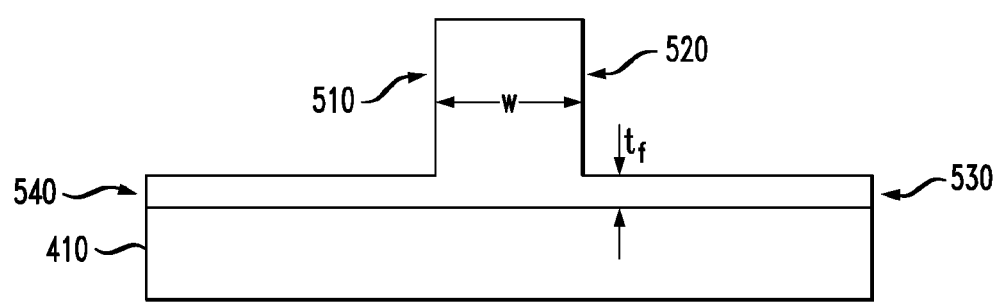

Turning now to FIG. 5, illustrated is the apparatus 400 of FIG. 4 after etching the material layer 420 to form the optical waveguide 510 having a ridge-shaped semiconductor optical core 520, and semiconductor slabs 530, 540. The resulting ridge-shaped semiconductor optical core 520 might have a width (w) ranging from about 400 nm to about 1200 nm, among others. Similarly, the semiconductor slabs 530, 540 might have a resulting thickness ($t_f$) ranging from about 20 nm to about 100 nm, and beyond. In the given embodiment, however, the resulting thickness ($t_f$) is around about 50 nm.

Those skilled in the art understand the many different processes that might be used to etch the material layer 420 to result in the optical waveguide 510 having a ridge-shaped semiconductor optical core 520, and semiconductor slabs 530, 540. In one embodiment, however, a patterned hardmask and photoresist is used, in conjunction with an etch chemistry configured to etch the material layer 420, to define such features. In those embodiments wherein the material layer 420 comprises silicon, various well-known dry and wet etchant processes might be used.

Figure 6:
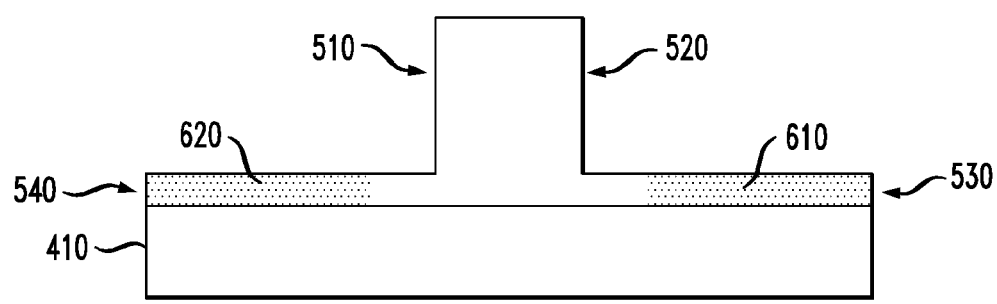

Turning now to FIG. 6, illustrated is the apparatus 400 of FIG. 5 after implanting dopants 610, 620, into the semiconductor slabs 530, 540, respectively. The dopants 610, 620, should generally be of the same charge-type. For instance, the dopants 610, 620 should either both be p-type or both be n-type. In the given embodiment, however, the dopants 610, 620 are n-type dopants, and thus might be phosphorous.

As indicated above, in one embodiment the concentrations of each of the dopants 610, 620, may be relatively the same at differing positions along their respective semiconductor slabs 530, 540. In this embodiment, the peak concentration of the dopants 610, 620, might range from about 1E18 atoms/cm³ to about 1E20 atoms/cm³. In other embodiments, however, the amount of each respective dopant 610, 620, is lesser proximate the ridge-shaped semiconductor optical core 520 than distal the ridge-shaped semiconductor optical core 520. Such embodiments might be considered as having a graded concentration of the dopant along their respective semiconductor slabs 530, 540. For instance, a concentration of the dopants 610, 620 might be at least about three, and often five, times lower proximate the ridge-shaped semiconductor optical core 520 than distal the ridge-shaped semiconductor optical core 520. In this embodiment, the peak concentration of the dopants 610, 620, proximate the ridge-shaped semiconductor optical core 520 might range from about 5E16 atoms/cm³ to about 1E20 atoms/cm³, and the peak concentration of the dopants 610, 620, distal the ridge-shaped semiconductor optical core 520 might range from about 1E18 atoms/cm³ to about 1E20 atoms/cm³. The aforementioned concentrations detail but one example, and thus should not be used to limit any contained herein.

The process for including the dopants 610, 620 within the semiconductor slabs 530, 540, respectively, may be conventional. For instance, conventional implantation processes could be used to include the dopants 610, 620 within the semiconductor slabs 530, 540, respectively. Wherein the dopants 610, 620 have the aforementioned graded concentrations, multiple photoresist and implant steps might be required. Nevertheless, based upon the foregoing, one skilled in the art of dopant implantation would understand the steps required to include the dopants 610, 620 within the semiconductor slabs 530, 540, respectively.

Figure 7:
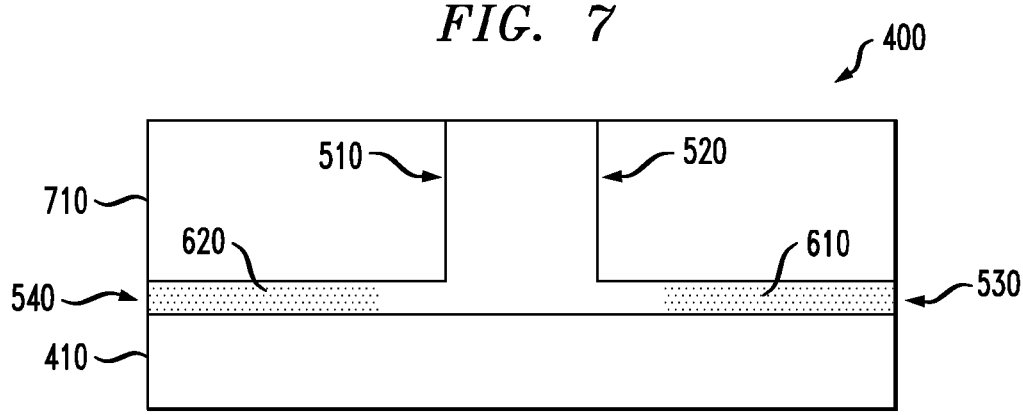

Turning now to FIG. 7, illustrated is the apparatus 400 of FIG. 6 after forming an optical confinement layer 710 substantially around the ridge-shaped semiconductor optical core 520 and over the semiconductor slabs 530, 540. The optical confinement layer 710, in the embodiment shown, comprises a transparent electrical dielectric with a suitably low refractive index to provide optical confinement in the adjacent core 520. For instance, an oxide or other similar material might be used as the optical confinement layer 710. The optical confinement layer 710 would generally be formed to a thickness as to cover the entire sidewalls of the ridge-shaped semiconductor optical core 520, but leave an upper surface thereof exposed.

The optical confinement layer 710 may be formed using conventional processes. In the embodiment wherein the confinement layer 710 comprises an oxide, the optical confinement layer 710 may either be deposited or grown and then planarized with a conventional chemical mechanical planarization technique. Those skilled in the art appreciate that the deposition of the optical confinement layer 710 would be significantly faster than the growth of the optical confinement layer 710. In other embodiments wherein the optical confinement layer 710 comprises a material different from oxide, other formation processes might be used.

Figure 8:
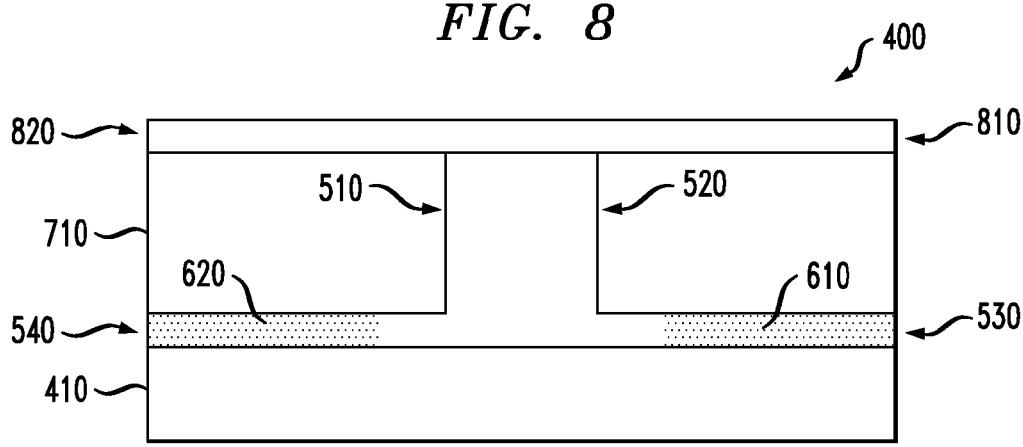

Turning now to FIG. 8, illustrated is the apparatus 400 of FIG. 7 after forming semiconductor slabs 810, 820 above the ridge-shaped semiconductor optical core 520. In the embodiment shown, the semiconductor slabs 810, 820 are formed of a single material layer, and directly contact the ridge-shaped semiconductor optical core 520. Without limitation, the semiconductor slabs 810, 820 may comprise a material similar to the material comprising the semiconductor slabs 530, 540, or in this embodiment silicon. The semiconductor slabs 810, 820, and more particularly the material layer comprising the semiconductor slabs 810, 820, may be formed using a process similar to that used to form the material layer 420. Accordingly, no further detail is needed.

Figure 9:
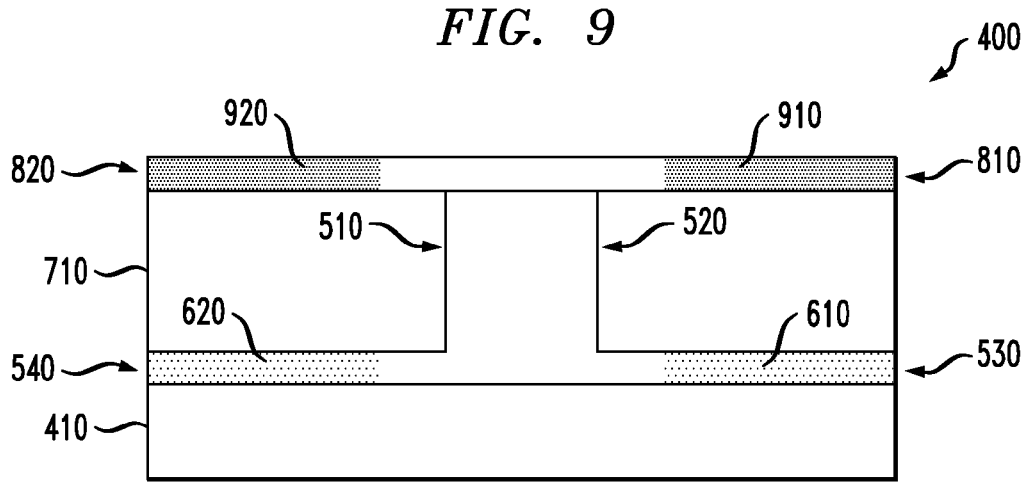

Turning now to FIG. 9, illustrated is the apparatus 400 of FIG. 8 after infusing dopants 910, 920 within the semiconductor slabs 810, 820, respectively, and activating the dopants 910, 920. The dopants 910, 920, should generally be of the same charge-type as one another, and opposite in charge-type to the dopants 610, 620. For instance, the dopants 910, 920 should either both be p-type or both be n-type, but should be opposite in type to the dopants 610, 620. In the given embodiment, however, the dopants 910, 920 are p-type dopants, and thus might be doped with boron.

As indicated above, in one embodiment the concentrations of each of the dopants 910, 920, may be relatively the same at differing positions along their respective semiconductor slabs 810, 820. In this disclosed embodiment, the peak concentration of the dopants 910, 920, might range from about 1E18 atoms/cm³ to about 1E20 atoms/cm³. In other embodiments, however, the amount of each respective dopant 910, 920, is lesser proximate the ridge-shaped semiconductor optical core 520 than distal the ridge-shaped semiconductor optical core 520. For instance, a concentration of the dopants 910, 920 might be at least about three, and often five, times lower proximate the ridge-shaped semiconductor optical core 520 than distal the ridge-shaped semiconductor optical core 520. In this disclosed embodiment, the peak concentration of the dopants 910, 920 proximate the ridge-shaped semiconductor optical core 520 might range from about 5E16 atoms/cm³ to about 1E19 atoms/cm³, and the peak concentration of the dopants 910, 920, distal the ridge-shaped semiconductor optical core 520 might range from about 1E18 atoms/cm³ to about 1E20 atoms/cm³. The aforementioned concentrations detail but one example.

The process for infusing the dopants 910, 920 within the semiconductor slabs 810, 820, respectively, and activating the dopants 910, 920, may be substantially similar to that discussed above with respect to the dopants 610, 620.

After including and activating the dopants 910, 920 within the semiconductor slabs 810, 820, respectively, another confinement layer might be formed there over, resulting in an apparatus 400 substantially similar to the apparatus 200 illustrated in FIG. 2. While the apparatus 400 and apparatus 200 have many similarities, they may also have certain differences. Accordingly, the apparatus 200 of FIG. 2 need not be identical to the apparatus 400 of FIG. 9, and vice-versa.

Turning now to FIG. 10, illustrated is a plan view of an optical communications system 1000, which may form one environment in which an apparatus 1005 (e.g., similar to the apparatus 100 or 200), may be used. An initial signal 1010 enters an optical transceiver 1020 of the optical communications system 1000. The optical transceiver 1020, receives the initial signal 1010, phase or amplitude modulates information, either based on the received signal or based separate information to be added to signal 1010, and sends the resulting information encoded optical signals across an optical fiber 1030 to an optical transceiver 1040. The optical transceiver 1040 receives the information encoded optical signals from the optical fiber 1030 and sends an output signal 1050. As illustrated in FIG. 10, the apparatus 1005 may be included within the transceiver 1040. The apparatus 1005 may also be included anywhere in the optical communications system 1000, including the transceiver 1020. It should be noted that the optical communications system 1000 is not limited to the devices previously mentioned. For example, the optical communications system 1000 may include an element 1060, such as a laser, light-emitting diode, modulator, optical amplifier, optical waveguide, photodetectors, dispersion compensation unit, or other similar device, which may also include the apparatus 1005.

Turning briefly to FIG. 11, illustrated is an alternative optical communications system 1100, having a repeater 1110, including a second optical receiver 1120 and a second optical transmitter 1130 (e.g., a transceiver), located between the optical transceiver 1020 and the optical transceiver 1040. As illustrated, the alternative optical communications system 1100 may also include the apparatus 1005.

Although the present invention has been described in detail, those skilled in the art should understand that they could make various changes, substitutions and alterations herein without departing from the spirit and scope of the invention.

What is claimed is:

1. An apparatus, comprising:
   a substrate having a surface;
   an optical waveguide having a ridge-shaped semiconductor optical core, the ridge-shaped semiconductor optical core being located over the surface, and not including a p-n junction;
   a first semiconductor slab being in contact with a first portion of the ridge-shaped semiconductor optical core, wherein the first semiconductor slab includes a first relatively low doped region proximate the ridge-shaped semiconductor optical core and a first relatively high doped region distal the ridge-shaped semiconductor optical core, and further wherein a peak dopant level of the first relatively low doped region and a peak dopant level of the first relatively high doped region are greater than a peak dopant level of the ridge-shaped semiconductor optical core, and further wherein an interface where the first semiconductor slab contacts the ridge-shaped semiconductor optical core does not form a p-n junction; and
   a second semiconductor slab being in contact with a second portion of the ridge-shaped semiconductor optical core, the second semiconductor slab being farther from the surface than the first semiconductor slab.

2. The apparatus as recited in claim 1 wherein the first semiconductor slab is located directly on the surface and the second semiconductor slab is located above the first semiconductor slab.

3. The apparatus as recited in claim 2 wherein the first and second semiconductor slabs are spatially separated from one another by a distance ranging from about 100 nm to about 250 nm.

4. The apparatus as recited in claim 1 wherein the first relatively low doped region has a dopant level at least three times lower than a dopant level of the first relatively higher doped region.

5. The apparatus as recited in claim 4 wherein the second semiconductor slab includes a second relatively low doped region proximate the ridge-shaped semiconductor optical core and a second relatively high doped region distal the ridge-shaped semiconductor optical core, the second relatively low doped region having a dopant level at least three times lower than a dopant level of the second relatively higher doped region.

6. The apparatus as recited in claim 1 wherein the second semiconductor slab includes a relatively low doped region proximate the ridge-shaped semiconductor optical core and a relatively high doped region distal the ridge-shaped semiconductor optical core, the relatively low doped region having a dopant level at least three times lower than a dopant level of the relatively higher doped region.

7. The apparatus as recited in claim 1 further including:
   a third semiconductor slab being in contact with a third portion of the ridge-shaped semiconductor optical core opposite the first portion; and
   a fourth semiconductor slab being in contact with a fourth portion of the ridge-shaped semiconductor optical core opposite the second portion, the fourth semiconductor slab being farther from the surface than the third semiconductor slab.

8. The apparatus as recited in claim 7 wherein the first and third semiconductor slabs are doped with a dopant and the second and fourth semiconductor slabs are doped with an opposite charge-type dopant.

9. The apparatus as recited in claim 1 wherein no physical interface exists where the first semiconductor slab contacts the first portion and wherein a physical interface does exist where the second semiconductor slab contacts the second portion.

10. The apparatus as recited in claim 1 wherein each of the ridge-shaped semiconductor optical core, first semiconductor slab and second semiconductor slab comprise silicon.

11. The apparatus as recited in claim 1, further including an optical fiber coupled to the optical waveguide, wherein the optical waveguide and the optical fiber form at least a portion of an optical communications system.

12. An apparatus, comprising:
    a substrate having a surface;
    an optical waveguide having a ridge-shaped semiconductor optical core, the ridge-shaped semiconductor optical core being located over the surface, and not including a p-n junction;
    a first semiconductor slab being in contact with a first portion of the ridge-shaped semiconductor optical core; and
    a second semiconductor slab being in contact with a second portion of the ridge-shaped semiconductor optical core, the second semiconductor slab being farther from the surface than the first semiconductor slab, wherein the second semiconductor slab includes a relatively low doped region proximate the ridge-shaped semiconductor optical core and a relatively high doped region distal the ridge-shaped semiconductor optical core, wherein a dopant profile of the semiconductor optical core differs from a dopant profile of the relatively low doped region and the relatively high doped region.

13. The apparatus as recited in claim 12 wherein the relatively low doped region has a dopant level at least three times lower than a dopant level of the relatively higher doped region.

14. The apparatus as recited in claim 1 wherein the ridge-shaped semiconductor optical core comprises an intrinsic semiconductor material.

15. The apparatus as recited in claim 1 wherein the peak dopant level of the first relatively low doped region ranges from about $1\times10^{16}$ atoms/cm$^3$ to about $5\times10^{18}$ atoms/cm$^3$ and the peak dopant level of the first relatively high doped region ranges from about $5\times10^{18}$ atoms/cm$^3$ to about $5\times10^{20}$ atoms/cm$^3$.

16. An apparatus, comprising: a substrate having a surface; an optical waveguide having a ridge-shaped semiconductor optical core, the ridge-shaped semiconductor optical core being located over the surface and comprising an intrinsic semiconductor material; a first semiconductor slab being in contact with a first portion of the ridge-shaped semiconductor optical core, wherein the first semiconductor slab includes a first relatively low doped region proximate the ridge-shaped semiconductor optical core and a first relatively high doped region distal the ridge-shaped semiconductor optical core, and further wherein an interface where the first semiconductor slab contacts the ridge-shaped semiconductor optical core does not form a p-n junction, wherein a dopant profile of the semiconductor optical core differs from a dopant profile of the relatively low doped region and the relatively high doped region; and a second semiconductor slab being in contact with a second portion of the ridge-shaped semiconductor optical core, the second semiconductor slab being farther from the surface than the first semiconductor slab.

17. The Apparatus of claim 1 wherein the semiconductor optical core comprises an intrinsic semiconductor material.

18. The Apparatus of claim 12 wherein the semiconductor optical core comprises an intrinsic semiconductor material.

* * * * *